United States Patent
Abdalla et al.

(10) Patent No.: US 8,879,618 B2
(45) Date of Patent: Nov. 4, 2014

(54) DECISION FEEDBACK EQUALIZER AND TRANSCEIVER

(75) Inventors: Mohamed Abdalla, Toronto (CA); Afshin Rezayee, Richmond Hill (CA); David Cassan, Toronto (CA); Marcus Van Ierssel, Toronto (CA); Chris Holdenried, Toronto (CA); Saman Sadr, Toronto (CA)

(73) Assignee: Semtech Canada Corporation, Burlington (CA)

( * ) Notice: Subject to any disclaimer, the term of this patent is extended or adjusted under 35 U.S.C. 154(b) by 291 days.

(21) Appl. No.: 13/231,300

(22) Filed: Sep. 13, 2011

(65) Prior Publication Data
US 2012/0201289 A1 Aug. 9, 2012

Related U.S. Application Data

(60) Provisional application No. 61/382,476, filed on Sep. 13, 2010.

(51) Int. Cl.
*H03H 7/32* (2006.01)

(52) U.S. Cl.
USPC ......................................... 375/233

(58) Field of Classification Search
CPC ............ H04L 25/0264; H04L 25/0272; H04L 25/0276; H04L 25/03057; H04L 2025/03433; H04L 2025/03439; H04L 2025/03541; H04L 2025/03547
USPC ........ 375/232, 233, 346, 350; 326/95, 97, 98; 327/552, 553, 554, 574, 576, 580, 581; 708/322, 323
See application file for complete search history.

(56) References Cited

U.S. PATENT DOCUMENTS

| | | | |
|---|---|---|---|
| 4,097,806 A * | 6/1978 | Evans | 375/231 |
| 7,184,478 B2 | 2/2007 | Popescu et al. | |
| 7,190,742 B2 | 3/2007 | Popescu et al. | |
| 7,242,332 B1 * | 7/2007 | Boemler | 341/118 |
| 7,321,621 B2 | 1/2008 | Popescu et al. | |
| 7,869,494 B2 | 1/2011 | Hollis | |
| 2004/0258183 A1 * | 12/2004 | Popescu et al. | 375/350 |
| 2006/0034394 A1 * | 2/2006 | Popescu et al. | 375/326 |
| 2008/0304557 A1 * | 12/2008 | Hollis | 375/231 |

OTHER PUBLICATIONS

Payne, Robert et al., "A 6.25-Gb/s binary transceiver in 0.13-μm CMOS for serial data transmission across high loss legacy backplane channels", IEEE J. Solid-State Circuits, vol. 40, No. 12, pp. 2646-2657, Dec. 2005. [Place of publication unknown].

(Continued)

*Primary Examiner* — Young T. Tse
(74) *Attorney, Agent, or Firm* — Ridout & Maybee LLP

(57) ABSTRACT

A decision feedback equalizer, transceiver, and method are provided, the equalizer having at least one comparator, the at least one comparator comprising a first stage, comprising a main branch having two track switches with a resistive load, an offset cancellation branch, a plurality of tap branches with transistor sizes smaller than the main branch, in which previous decisions of the equalizer are mixed with the tap weights using current-mode switching, and a cross coupled latch branch; and a second stage, comprising a comparator module for making decisions based on the outputs of the first stage and a clock input, and a plurality of flip-flops for storing the output of the comparator module.

16 Claims, 12 Drawing Sheets

(56) References Cited

OTHER PUBLICATIONS

Hidaka, Yasuo et al., "A 4-Channel 1.25-10.3 Gb/s Backplane Transceiver Macro With 35 dB Equalizer and Sign-Based Zero-Forcing Adaptive Control", IEEE J. Solid-State Circuits, vol. 44, No. 12, pp. 3547-3559, Dec. 2009. [Place of publication unknown].

Wang, Huaide et al., "A 21-Gb/s 87-mW Transceiver With FFE/DFE/Analog Equalizer in 65-nm CMOS Technology", IEEE J. Solid-State Circuits, vol. 45, No. 4, pp. 909-920, Apr. 2010. [Place of publication unknown].

Ren, Jihong et al., "Performance Analysis of Edge-based DFE", 2006 IEEE Electrical Performance of Electronic Packaging, pp. 265-268, Oct. 2006. [Place of publication unknown].

Krishnapura, Nagendra et al., "A 5Gb/s NRZ Transceiver with Adaptive Equalization for Backplane Transmission", 2005 IEEE Solid-State Circuits Conference, pp. 60-61, Feb. 7, 2005. [Place of publication unknown].

Chen, E-Hung et al. "Near-Optimal Equalizer and Timing Adaptation for I/O Links Using a BER-Based Metric", IEEE J. Solid-State Circuits, pp. 2144-2156, vol. 43, No. 9, Sep. 2008. [Place of publication unknown].

Balamurugan, Ganesh et al., "A 5-to-25Gb/s 1.6-to-3.8mW/(Gb/s) Reconfigurable Transceiver in 45nm CMOS", 2010 IEEE Solid-State Circuits Conference, pp. 372-373, Feb. 2010. [Place of publication unknown].

Wu, Song et al., "Design of a 6.25 Gbps backplane SerDes with TOP-down design methodology", DesignCon, pp. 2004. [Place of publication unknown].

\* cited by examiner

DECISION FEEDBACK EQUALIZER AND TRANSCEIVER

This application claims the benefit of and priority to U.S. Patent Application Ser. No. 61/382,476, filed Sep. 13, 2010, the contents of which are incorporated herein by reference.

BACKGROUND

This disclosure relates to equalizers, transmitters and receivers.

Bandwidth limitation of existing backplanes has become an obstacle to meet the increasing demand for high data rate wireline transmission.

BRIEF DESCRIPTION OF THE DRAWINGS

Example embodiments will be described with reference to the following Figures.

SUMMARY OF THE INVENTION

Figure 1:
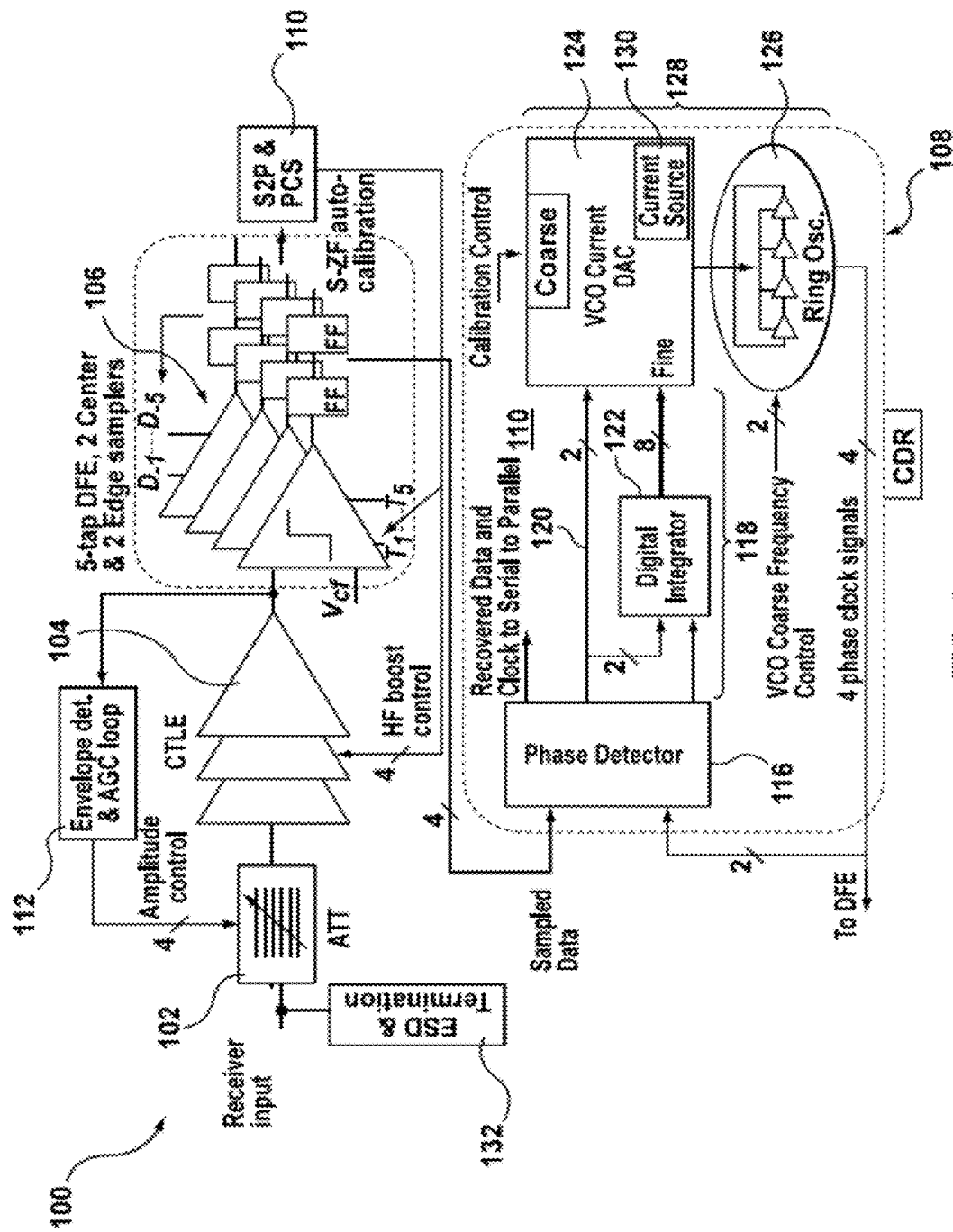
FIG. 1 is block diagram of a receiver according to an example embodiment.

The present disclosure describes a method for adapting an equalizer having a plurality of taps spaced sequentially at periods of one clock unit for observing a digital data system response produced by a digital system, comprising applying an arbitrary digital data sequence to the digital system, detecting a first predetermined digital data pattern in the data sequence, calculating a first error signal for a first tap of the plurality of taps based on the system response to the first data pattern, using the first error signal to adapt the first tap, and repeating the steps of detecting a data pattern, calculating an error signal, and adapting the tap for each tap other than the first tap in the plurality of taps, wherein the digital data pattern used in conjunction with a given tap at position k in the sequence of taps has equal symbol values at positions (m−k) and (m−k−1) and different symbol values at positions (m−p) and (m−p−1), where p is not equal to k, for some value of m, and the error signal calculated for the tap at sequential position k is proportional to the sum of the values of the pulse response of the system measured at the zero crossing directly before and after the lone bit of the pulse.

In another aspect, the equalizer comprises a decision feedback equalizer.

In another aspect, the plurality of taps comprises five taps.

In another aspect, the taps are adapted sequentially in time according to their sequential positions.

In another aspect, the system further comprises a clock and data recovery stage having comparators used by the clock and data recovery stage to sample the data and obtain edge information for decision feedback adaptation, wherein the clock and data recovery stage comparators are also used to obtain edge information for adapting the taps of the equalizer.

In another aspect, adapting a tap comprises applying de-emphasis or pre-emphasis based on the calculated error signal.

In another aspect, the system comprises at least one far-end transmit pre-emphasis tap, the method further comprising transmitting at least one of the calculated error signals to the at least one far-end transmit pre-emphasis tap, and adapting the at least one far-end transmit pre-emphasis tap based on the at least one transmitted calculated error signal.

In another aspect, the plurality of taps comprises N taps, and wherein the equalizer further comprises a linear equalizer, further comprising detecting a data pattern in the data sequence having equal symbol values at positions (m−k) and (m−k−1) for tap position k having values from 1 to N, calculating a linear equalizer error signal which is proportional to the sum of the first N samples of the pulse response at each data edge following the symbol at position m, and adapting the linear equalizer using the linear equalizer error signal.

In another aspect, the linear equalizer comprises a continuous time linear equalizer.

In another aspect, the disclosure describes a decision feedback equalizer having at least one comparator, the at least one comparator comprising a first stage, comprising a main branch having two track switches with a resistive load, an offset cancellation branch, a plurality of tap branches with transistor sizes smaller than the main branch, in which previous decisions of the equalizer are mixed with the tap weights using current-mode switching, and a cross coupled latch branch; and a second stage, comprising a comparator module for making decisions based on the outputs of the first stage and a clock input, and a plurality of flip-flops for storing the output of the comparator module.

In another aspect, the offset cancellation branch has the same structure as the main branch.

In another aspect, the at least one comparator comprises two edge comparators and two center comparators.

In another aspect, the at least one comparator is implemented using a pseudo-current-mode logic topology.

In another aspect, the decision feedback equalizer further comprises a continuous time linear equalizer which comprises a differential pair input stage, an active inductive load, a common mode feedback amplifier for setting the common mode for the at least one pseudo-current-mode logic decision feedback equalizer comparator.

In another aspect, the decision feedback equalizer further comprises a programmable attenuator having a plurality of branches, each branch comprising a series switch, a shunt switch, and a capacitor which can be changed from a series capacitor to a shunt capacitor based on the state of the series switch and the shunt switch.

In another aspect, the at least one comparator is implemented as a differential pseudo-current mode logic structure comprising a cascade of a first NMOS transistor in common source orientation in series with a second NMOS transistor, wherein the second NMOS transistor acts as a switch and is connected at the drain terminal of the first transistor.

In another aspect, the disclosure describes a receiver, comprising a digitally programmable termination unit, a digitally programmable attenuator, a continuous time linear equalizer, an envelope detector, an automatic gain control loop, a half-rate decision feedback equalizer; a plurality of flip flops for storing the output of the decision feedback equalizer, a de-serializer, and a clock and data recovery circuit comprising a bang-bang half-rate phase detector, a loop filter having a proportional path and an integral path, and a current digital to analog converter driving a ring voltage controlled oscillator.

In another aspect, the disclosure describes a transmitter, comprising a clock multiplication unit, a deserializer, and a transmit driver comprising a plurality of line and pre-drivers, each line and pre-driver comprising a digital multiplexor, a pre-driver cell, a delay control block for controlling the delay of the pre-driver cell, and an H-bridge driver cell, a digital control block for controlling the delay control block, a common-mode control block having a replica circuit and a buffer, at least one digitally programmable on-chip termination resistor, and a bias generator.

Other example embodiments of the present disclosure will be apparent to those of ordinary skill in the art from a review of the following detailed description in conjunction with the drawings.

DESCRIPTION OF EXAMPLE EMBODIMENTS

According to example embodiments, in order to compensate for bandwidth limitation of backplanes, a transceiver that employs a combination of Tx pre-emphasis, an advanced Rx continuous time linear equalizer (CTLE) and a decision feedback equalizer (DFE) can be used. In one example embodiment, this description presents a 4-lane transceiver implemented in 40 nm CMOS (Complementary metal-oxide-semiconductor) technology that operates over a wide range of data rates from 1 to 12 Gbps (48 Gbps aggregated) using NRZ (non-return to zero) coding. The supply voltages are 0.9V and 1.8V. In an example embodiment, an innovative algorithm, as described in greater detail below, is used to adapt the CTLE and DFE to cancel the channel ISI (inter-symbol interference). In at least some examples, no inductors are used in the transceiver and ring oscillators are used for both the Tx and Rx clock generation. In some applications, this may provide a wide frequency tuning range, small layout area, and improved design portability. With extensive use of digital programmability, in example embodiments the transceiver is capable of meeting specifications of different standards, such as PCIe, SATA, and 1-10 Gbps Ethernet.

Figure 11:
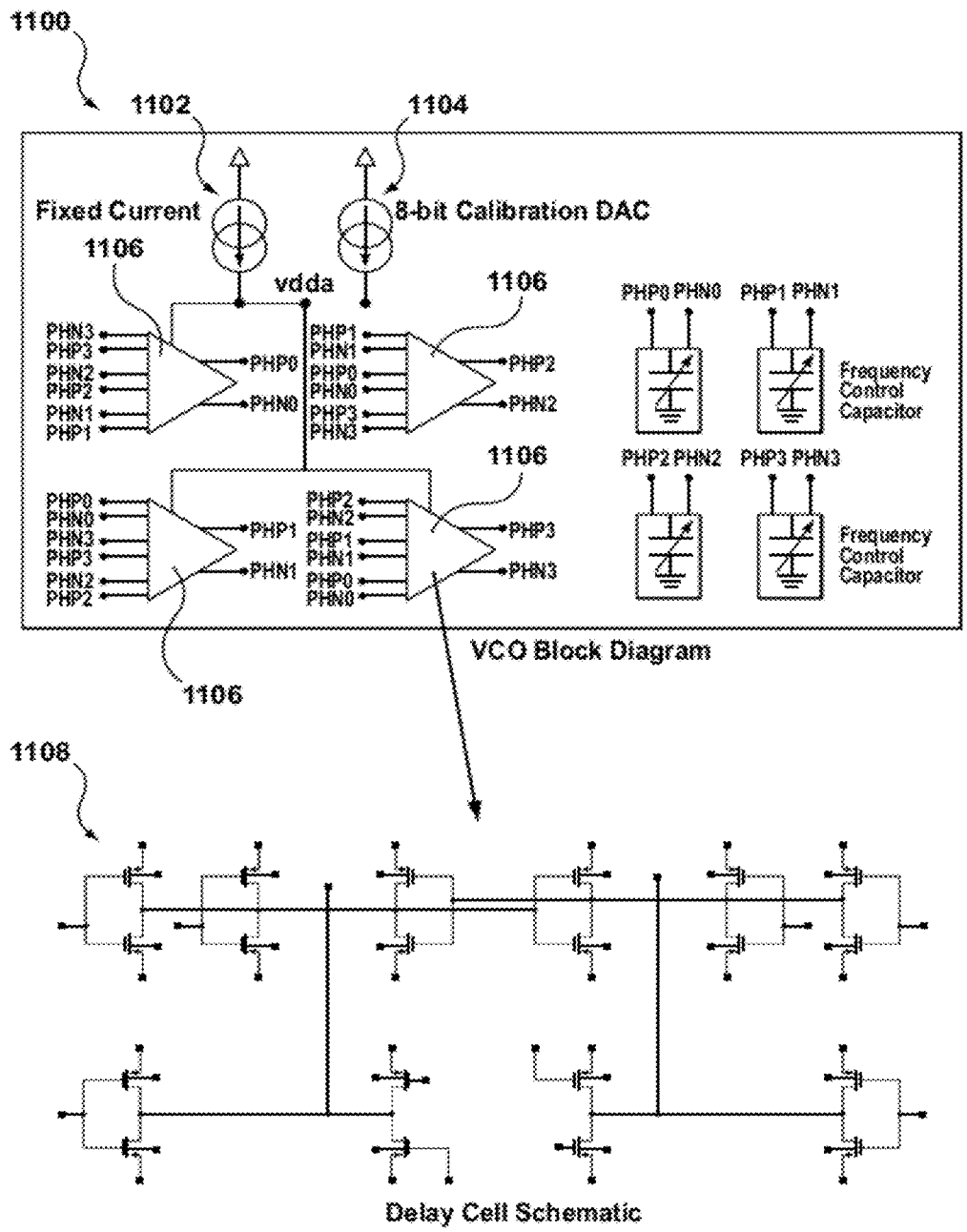
FIG. 11 is a block diagram of a VCO (voltage-controlled oscillator) with an expanded schematic of a delay cell according to an example embodiment.

In an example embodiment shown in FIG. 1, the Rx front-end 100 includes a programmable attenuator 102 (ATT), a CTLE 104 and a 5-tap decision feedback equalizer 106 (DFE) that is followed by a Clock and Data Recovery (CDR) stage 108 and a de-serializer 110. The ATT 102 uses an AGC (automatic gain control) loop 112 to set the desired signal level at the input of the DFE 106. According to example embodiments, as described in greater detail below, a sign zero-forcing (S-ZF) adaptation algorithm with pattern filtering is used to adapt the CTLE 104 and the DFE 106 taps. In an example embodiment, the error signals for the S-ZF algorithm are generated from the same comparators used by the CDR 108, eliminating the need for additional comparators for adaptation. In addition, during test and debugging modes one of the edge comparators may be re-used as an on-chip eye-monitor. The CDR 108 is based on a half rate bang-bang phase detector 116 and a digital loop filter 118 consisting of both a proportional path 120 and an integral path 122. Bang-bang phase detectors are binary phase detectors which provide only late/early information and do not provide any information about the magnitude of the phase difference. The proportional signals 120 from the phase detector 116 directly control the CDR VCO 128 (voltage controlled oscillator). This is achieved by switching on and off a current source 130 that modulates the VCO frequency accordingly. Instead of using a conventional analog loop filter, the integral path 122 uses an up/down counter, which provides control on the loop stability and programmability for optimum performance at different data rates. The output of the counter drives a current digital-to-analog converter 124 (DAC) and is added to the current generated by the proportional branch 120 and then feeds the VCO 128 as shown in FIG. 1. The VCO 128, which is shown in FIG. 11, is based on a four-stage current controlled ring oscillator 126 with a 1 to 6 GHz tuning range. The amount of current that is generated by the current DAC 124 controls the delay per stage and consequently controls the VCO frequency. The wide bandwidth of the bang-bang CDR loop 108 significantly suppresses the ring oscillator's 126 inherent phase noise. To further improve the VCO tuning range, VCO coarse tuning is achieved by switching load capacitors at the delay cell 1106 outputs (see FIG. 11). When the switches are programmed to increase the capacitive loading at the delay cells, the VCO frequency goes down, and vice versa.

At start up, a digital calibration uses the same current DAC 124 to pull the VCO frequency close to the locking condition. This is achieved by using a digital counter that counts the number of pulses using the reference clock and another counter that counts using a divided down version of the recovered clock. The outputs of the two counters are compared, and if the VCO frequency is found to be lower than the desired value, it is incremented, and vice versa. After that, the control is switched to a real time CDR closed loop 108. The frequency error that the CDR loop 108 can lock to is within +/−5000 ppm (parts per million) in some example embodiments.

Figure 2:
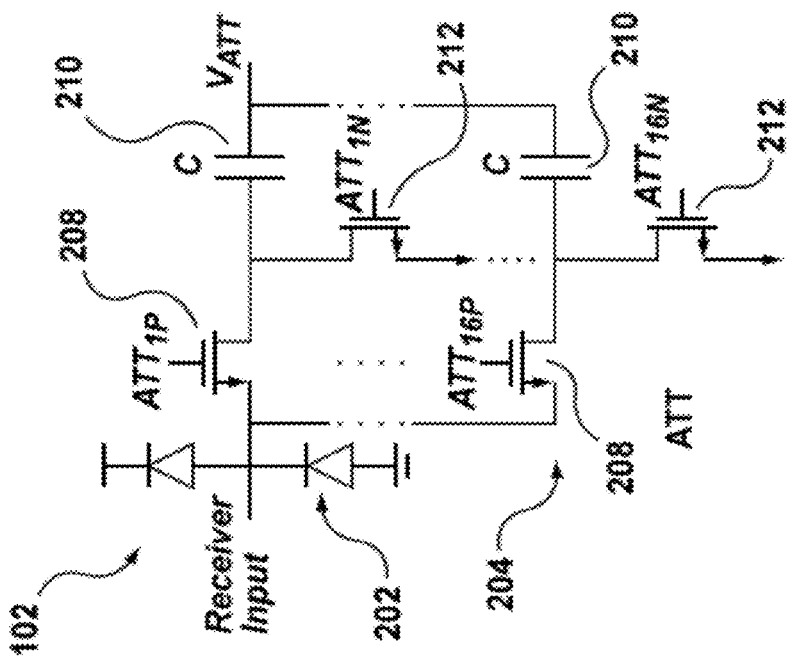
FIG. 2 is an abbreviated front-end schematic of a receiver attenuator according to an example embodiment, omitting stages 2 through 15.

In an example embodiment, the ATT 102 is realized using a passive capacitive divider, a possible configuration of which is illustrated in FIG. 2. FIG. 2 shows the first stage 202 and last stage 204 of a 16-stage attenuator 102, with stages 2 through 15 left out to simplify the figure. A wide tuning range is achieved by using both programmable series capacitors and shunt capacitors. As shown in FIG. 2, switches 208, 212 are used to reconfigure series capacitors as shunt capacitors and vice versa, which allows the re-use of the capacitors 210 between the shunt and series branches and hence allows for a compact implementation.

Figure 3:
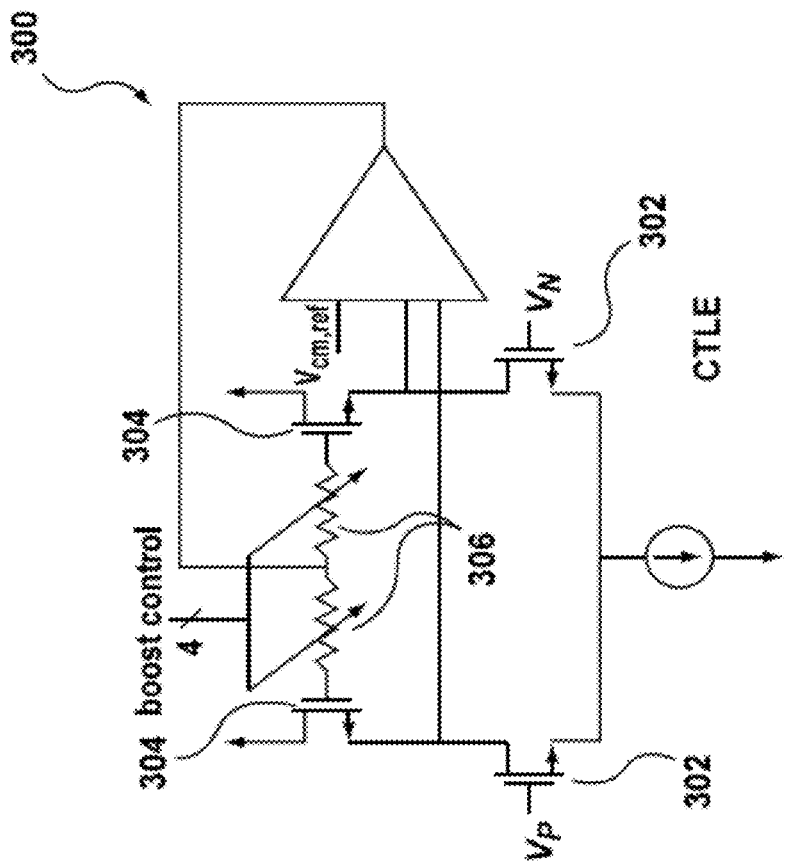
FIG. 3 is a schematic of a continuous time linear equalizer according to an example embodiment.

In an example embodiment, the CTLE is a 3 stage equalizer, a possible configuration of one stage of which is also illustrated in FIG. 3. Each stage 300 consists of a differential pair 302 with an NMOS (N-type metal-oxide-semiconductor)

active inductor load 304. Using the active inductors 306 improves the portability of the design to other technologies/metal stacks.

Figure 4:
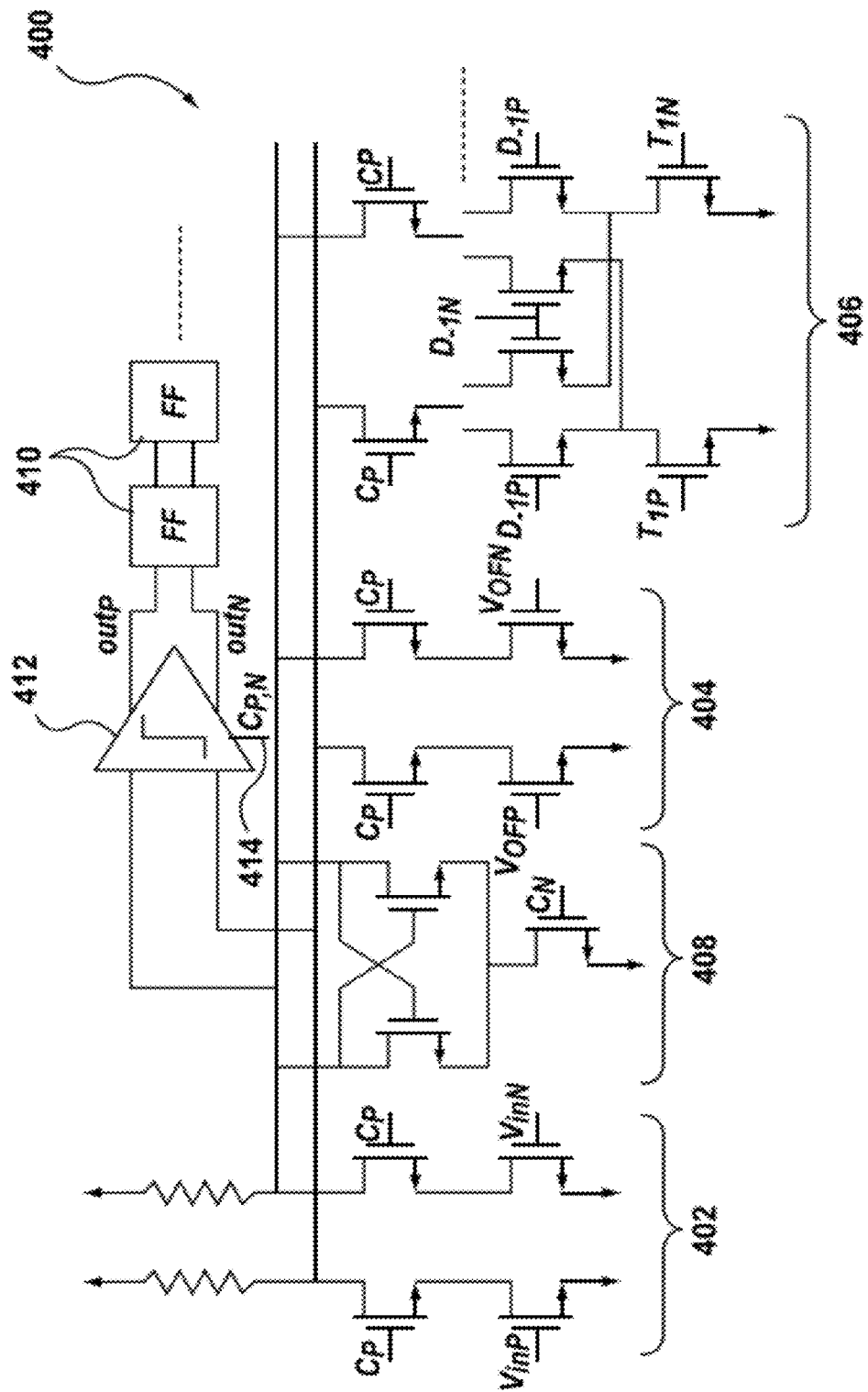
FIG. 4 is an abbreviated schematic of a DFE comparator according to an example embodiment, showing a first tap branch but omitting tap branches 2 to 5.

The DFE 106 employs four low-power comparators, comprising two data and two edge comparators. Each comparator 400, a possible configuration of which is illustrated in FIG. 4, contains a main branch 402, an identical offset branch 404, and 5 tap branches 406, with the tap 1 branch having ½ the main branch transistor size and taps 2 to 5 having ¼ the main branch transistor size. (In FIG. 4, only the first tap branch is shown to simplify the figure. Tap branches 2 to 5 have the same structure as tap branch 1 406.) This scaling helps reduce the DFE 106 power consumption. The comparators 400 may use a pseudo-CML (current-mode logic) topology to allow for high-speed operation from a 0.9V supply. Accurate setting of the input common-mode can in an example embodiment be achieved through the CMFB (continuous-time common-mode feedback circuit) in the CTLE 104. Furthermore, this common-mode reference voltage is used to set the mid-voltage of a resistive ladder which is used to generate the offset and tap voltages. The DFE coefficients are adapted to minimize the ISI at the zero-crossings of the received data, which also improves the x-opening of the received eye, thus reducing the recovered clock jitter.

FIG. 4 also shows the comparator module 412 and two stages of flip-flops 410 used by the DFE comparator 400.

The details on the DFE tap adaptation algorithm are provided below. The error signal for adaptation is the edge comparator output. However, in example embodiments, the error signal is only used for specific patterns, which significantly simplifies the calibration procedure and allows calibrating the taps independently. The approach used in example embodiments selects the appropriate patterns to adapt each tap. The technique uses a single pattern per tap and computes the error signal from multiple edge decisions for a lone 1 or 0 following these patterns. This same technique is also used to adapt the CTLE by choosing a pattern that generates an error signal that is proportional to the sum of the first 5 edge-ISI components. Compared to a SS-LMS (sign-sign least mean square) algorithm, the presently described algorithm may in some applications produce much less noise on the tap weights and avoid divergence in the case of no transitions or periodic patterns. The same technique may also be extended to adapt the far-end Tx pre-emphasis taps by transmitting back these error signals.

In example embodiments, the Tx (transmitter) driver 500 is based on an H-bridge architecture 504, which uses a VCM control 506 having a replica circuit and a buffer to set the driver common mode output voltage. This method of common mode control can be beneficial for PCIe (PCI express) receiver-detect requirements. In examples; the output driver 500 consists of sixteen identical driver/pre-driver cells 508 placed in parallel. Each of these cells 508 is controlled individually to facilitate four-tap Tx FFE (feed-forward equalization)—1 tap pre-cursor, 1 main tap, and 2 taps post-cursor—and slew rate control. Each cell includes a multiplexer 510 (MUX) that selects between the main signal 524 and the early or delayed signals 522 (i.e. one signal delayed by 2UI, one signal delayed by 1 UI, and one signal early by 1 UI) to achieve up to 3 dB pre-emphasis and/or 12 dB deemphasis. The slew rate programmability is achieved by individually controlling the delay of the pre-driver cells 520 at delay control 518. The amplitude of the differential output (positive output 532 and negative output 534) is programmable from 200 to 1000 mVpp (milli-Volt peak-to-peak), which is controlled by changing the bias of the H-bridge current sources 512 using a bias generator 516 to generate a constant current across process and temperature variations. The VCO (not shown) used for the Tx CMU 514 (clock multiplication unit) is also based on a four-stage ring oscillator architecture (similar in some embodiments to the ring oscillator 126). To minimize the Tx output jitter, an on-chip regulated supply (not shown) is used for the VCO and the Tx clock path. Similar to the CDR VCO 128, the CMU VCO is calibrated at start up to achieve optimum tuning range for the desired data rate.

Figure 5:
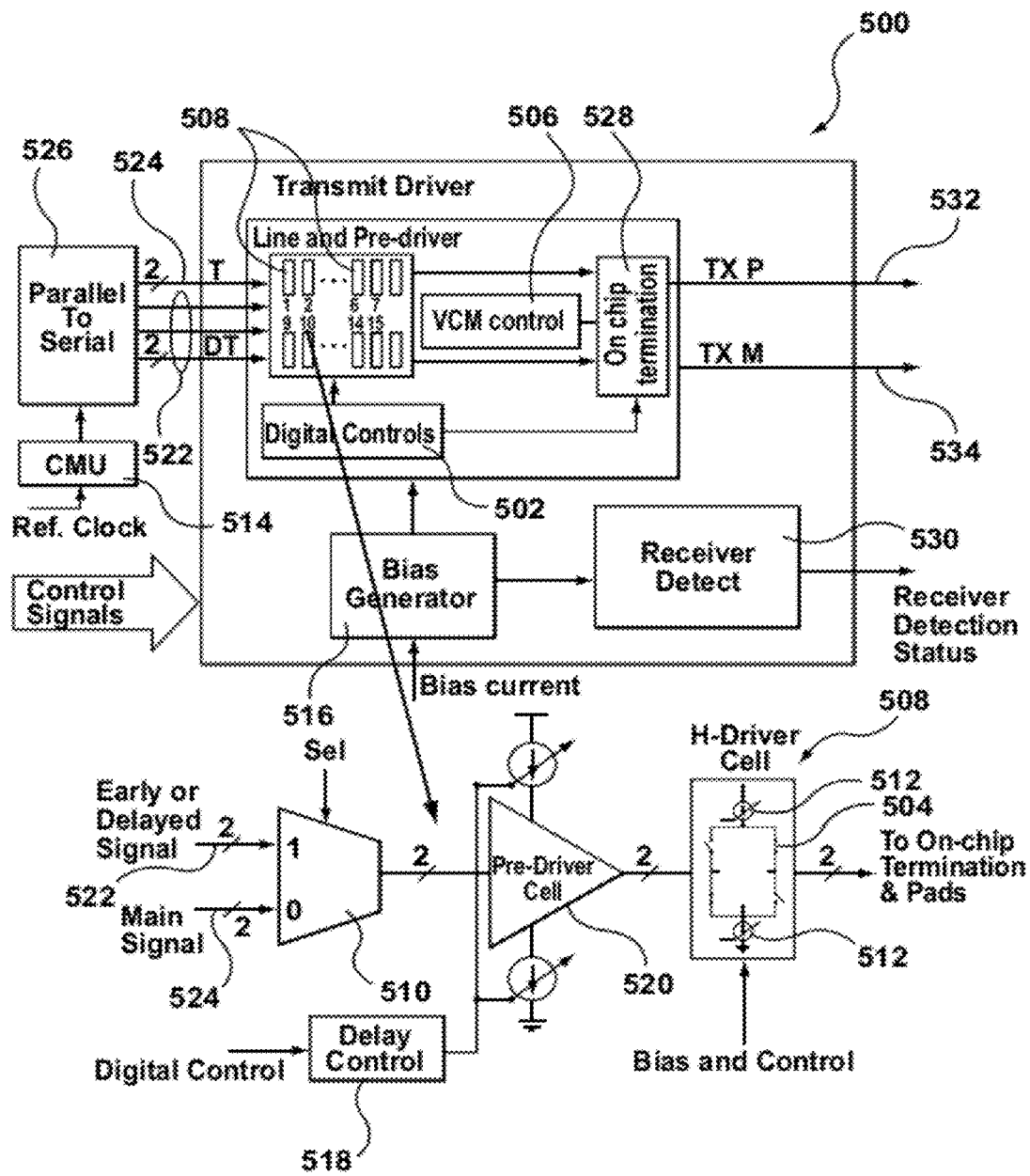
FIG. 5 is a block diagram of a transmitter with an expanded view of a driver/pre-driver cell according to an example embodiment.

FIG. 5 also shows a serializer 526, an on-chip termination module 528 used to force the common node between differential termination, a receiver detect module 530 used to detect the presence of an attached receiver, and digital controls 502 for providing the programmable logic for the delay control 518 and the on chip termination module 528.

Figure 6:
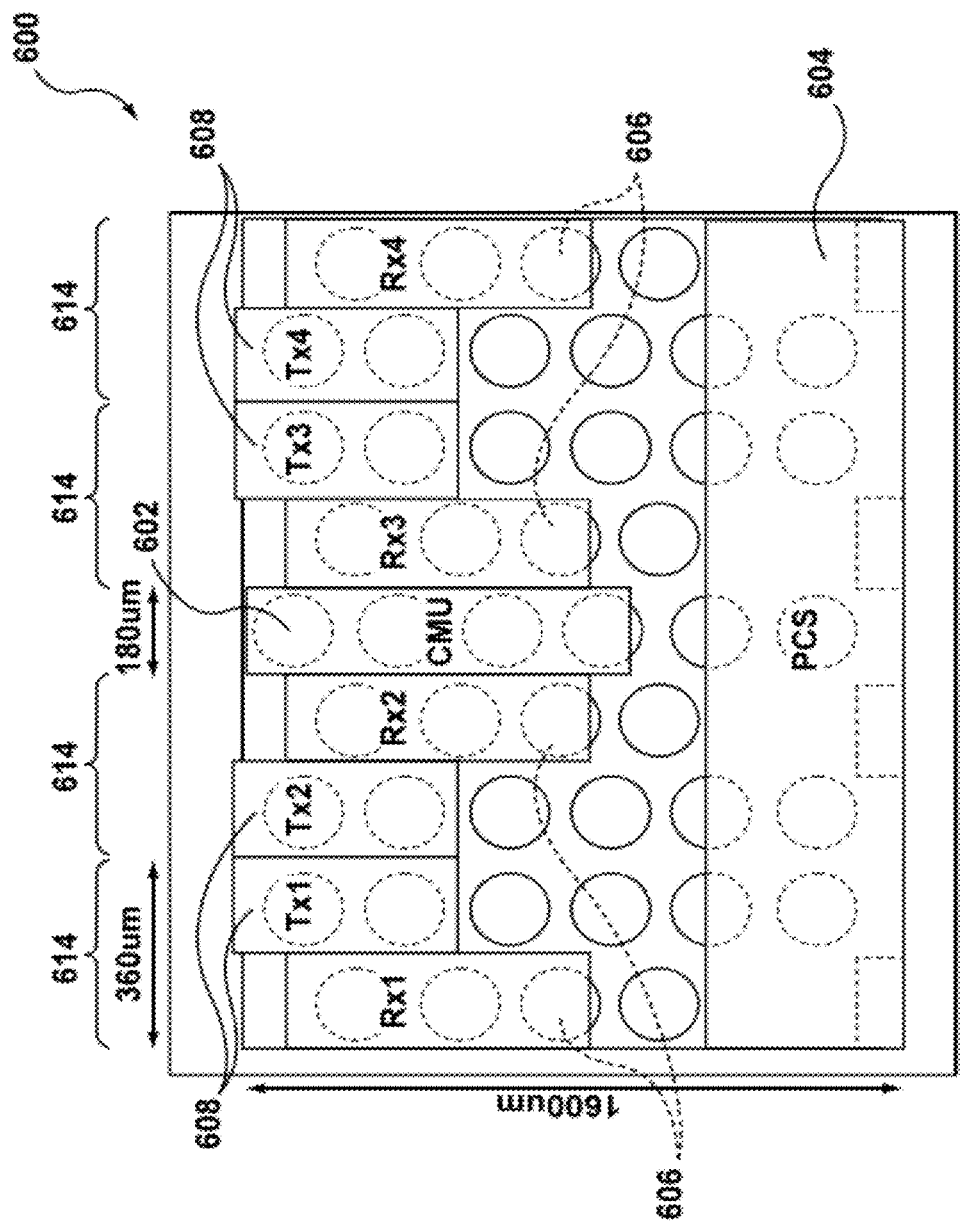
FIG. 6 is a photograph of a die according to an example embodiment.

FIG. 6 shows an example of a die photo according to example embodiments. The die 600 has a single CMU 602 shared between four lanes 614. Each lane 614 comprises a transmitter 608 adjoining a receiver 606. The die 600 has a PCS 604 (physical coding sub-layer) for digital communications. In example embodiments, the CMU is 180 μm wide, each lane is 360 μm wide, and the die 600 is 1160 μm long. In other embodiments, the die 600 may have multiple CMUs 602 shared between more than four lanes 614.

Figure 7:
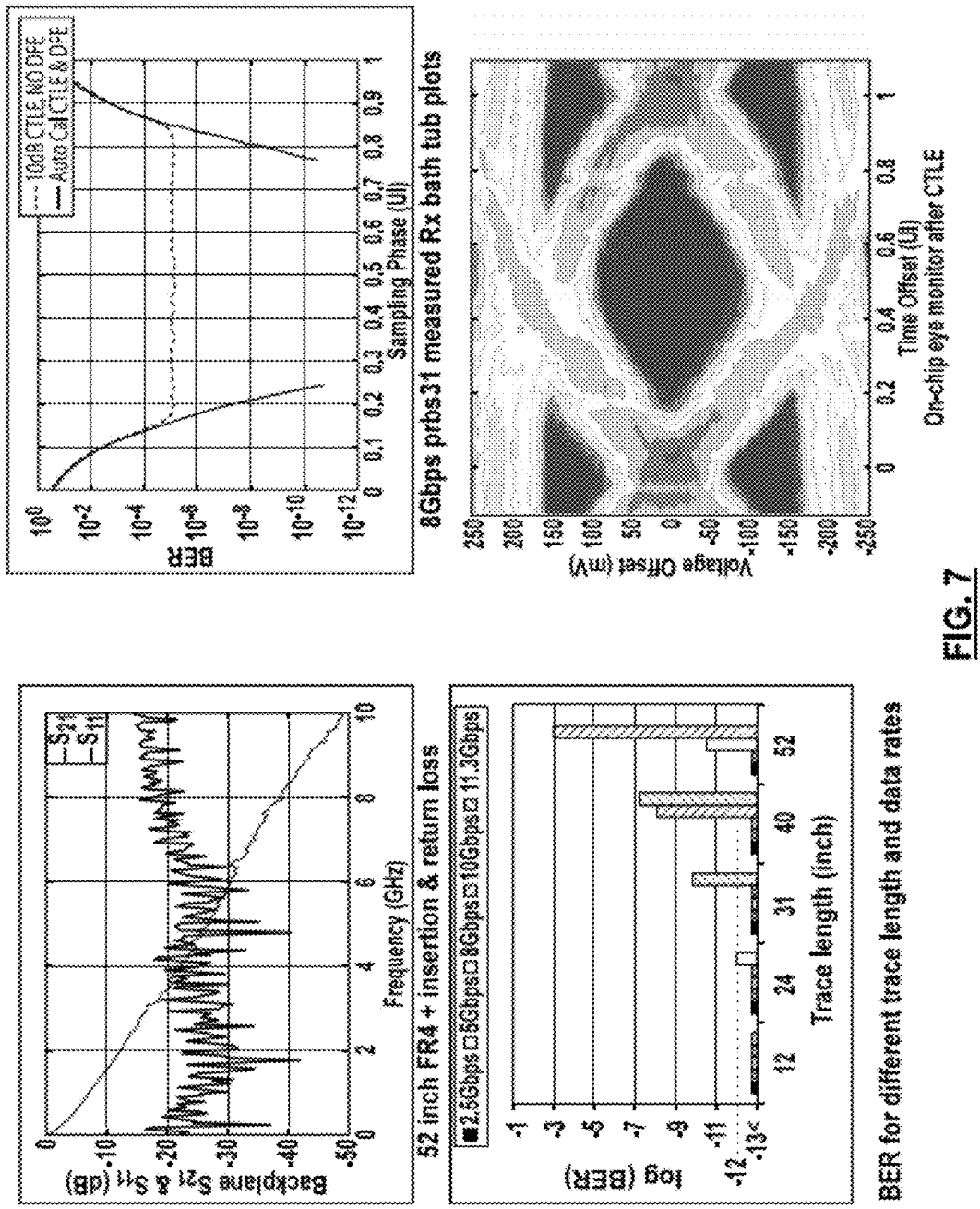
FIG. 7 is a graph of the performance of a receiver according to an example embodiment.
Figure 8:
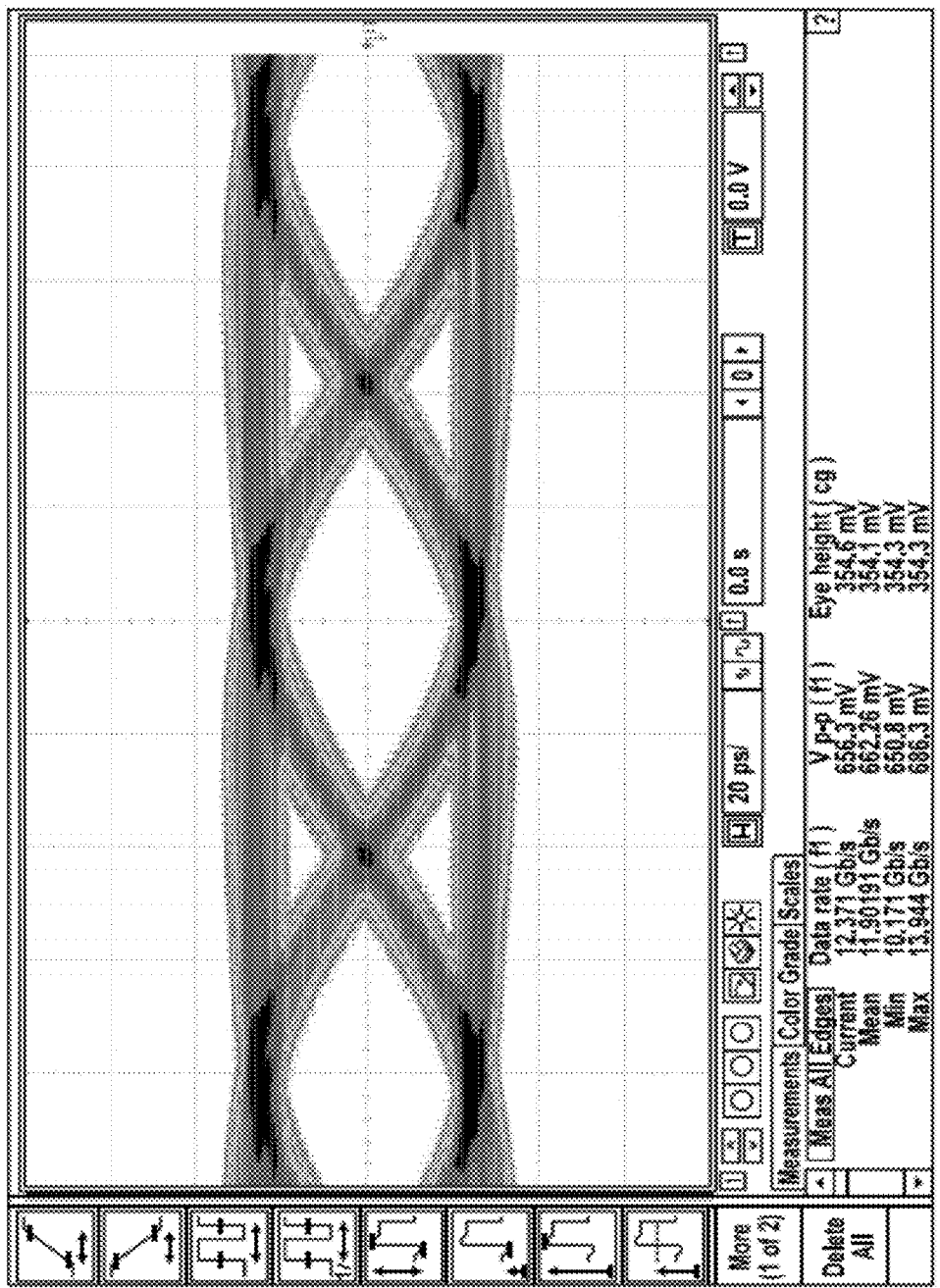
FIG. 8 is an eye diagram showing the performance of a transmitter according to an example embodiment.

An example of measured insertion and return loss of a 52 inch FR4+ backplane is shown in FIG. 7. This channel is used to generate the Rx bathtub curves for an 8 Gbps PRBS31 before and after the CTLE/DFE adaptation, and FIG. 4 demonstrates the effectiveness of the adaptation in opening the eye at the input of the sampler. Furthermore, the Rx performance is evaluated by measuring the BER for 2.5 to 11.3 Gbps PRBS31 inputs after 12 to 52 inch of the backplane. An on-chip eye monitor is used to measure the internal eye after the CTLE as it is shown in FIG. 7. A representative measured Tx output eye diagram at 12 Gbps is shown in FIG. 8 by way of example. Table 1 below provides a performance summary according to an example embodiment.

TABLE 1

| Performance summary | | |
|---|---|---|
| Technology | | 40 nm CMOS |
| Package | | Flip-chip BGA |
| Supply voltage | VDDA | 0.9 V |
| | VDDHA | 1.8 V |
| Speed | | 1-12 Gbps |
| DFE taps | | 5 |
| Tx FIR taps | | 4 |
| Power per lane at 10.3125 Gbps | 800 mV output differential swing | 87 mW |
| Power per lane at 8 Gbps | 800 mV output differential swing | 73 mW |
| Open loop VCO phase noise @ 5 GHz (10 Gbps) (No LC tank) | 1 MHz offset | −80 dBc/Hz |
| Tx driver jitter @10 Gbps | 800 mV output swing | 1.4 ps (rms) |
| Area | Lane | 360 um × 750 um |
| | CMU | 180 um × 880 um |

The DFE and S-ZF algorithm according to example embodiments will now be described in greater detail. In at least one example implementation, an aim of using an edge decision feedback equalizer (DFE) with clock and data recovery CDRs is to minimize the inter-symbol interference (ISI) at the zero-crossings of the received data. This in turn maximizes the x-opening of the received eye, and also helps in reducing the recovered clock jitter.

Example embodiments described herein present a method for adapting the taps of edge DFEs. Also described according to an example embodiment is a low-power high-speed comparator operating from a low voltage supply that does not require the use of inductors.

Adaptation Algorithm

The tap weights of an edge DFE can be adapted using a sign-sign least mean square (SS-LMS) algorithm, by using a sign zero forcing (S-ZF) algorithm, or by monitoring the eye. The LMS method tries to minimize:

$$\sum_{k=-\infty}^{\infty} e_k^2.$$

where $e_k$ is an error signal, whereas the ZF method tries to minimize $$\sum_{k=start}^{end} w_k e_k^2$$

over an observation period and $w_k$ is a weight function. The eye monitoring method relies on bit error rate (BER) measurement which makes it very slow compared to the LMS and ZF methods. Using the LMS approach to adapt the edge DFE taps results in a lot of noise on the tap weights which requires the use of extensive filtering. Furthermore, in most cases using LMS to adapt the DFE taps requires all the taps to be adapted simultaneously in order to reach the optimal solution. This is a result of the multi-dimensional nature of the optimization problem which is of the order of the number of taps being adapted. This complicates the design of DFEs with higher number of taps, e.g. 5+.

In example embodiments of this invention, a novel S-ZF adaptive algorithm with pattern filtering is presented to adapt the taps of an edge DFE. As an example the algorithm is applied to a 5-tap edge DFE. However, this algorithm is general and can be applied to any number of taps. The error signals for the S-ZF algorithm are generated from the same comparators used by the CDR to obtain the edge information, thereby eliminating the need for additional comparators for the DFE adaptation.

The algorithm tries to adapt the tap weights by increasing or decreasing them to precisely cancel their corresponding ISI terms. Thus, tap 1 is adapted to precisely cancel ISI1.5, where ISI1.5 is the ISI component 1.5UI apart from the main cursor, tap 2 is adapted to cancel ISI2.5, and so on. The error signals are generated from the edge comparators. However, the error signals are only detected for specific patterns which help decouple the 5-dimensional optimization problem into 5 1-dimensional optimization problems. In some implementations, this significantly simplifies the calibration procedure, and allows adapting the taps sequentially.

Figure 9:
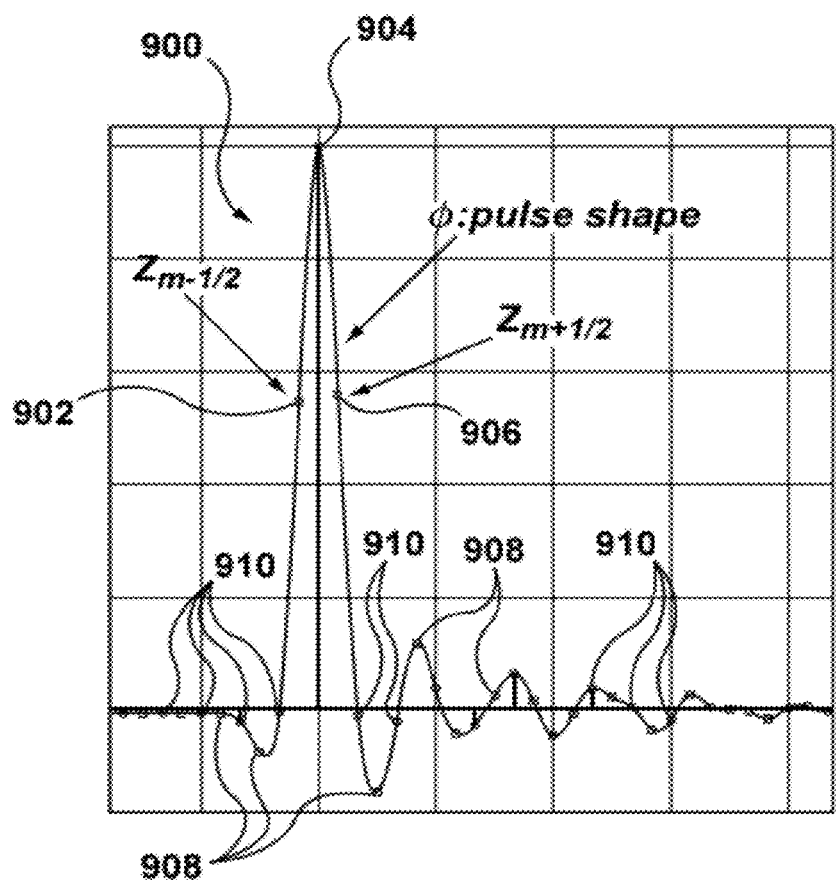
FIG. 9 is a graph of the pulse response of an arbitrary channel after being compensated by a continuous time linear equalizer according to an example embodiment.
Figure 10:
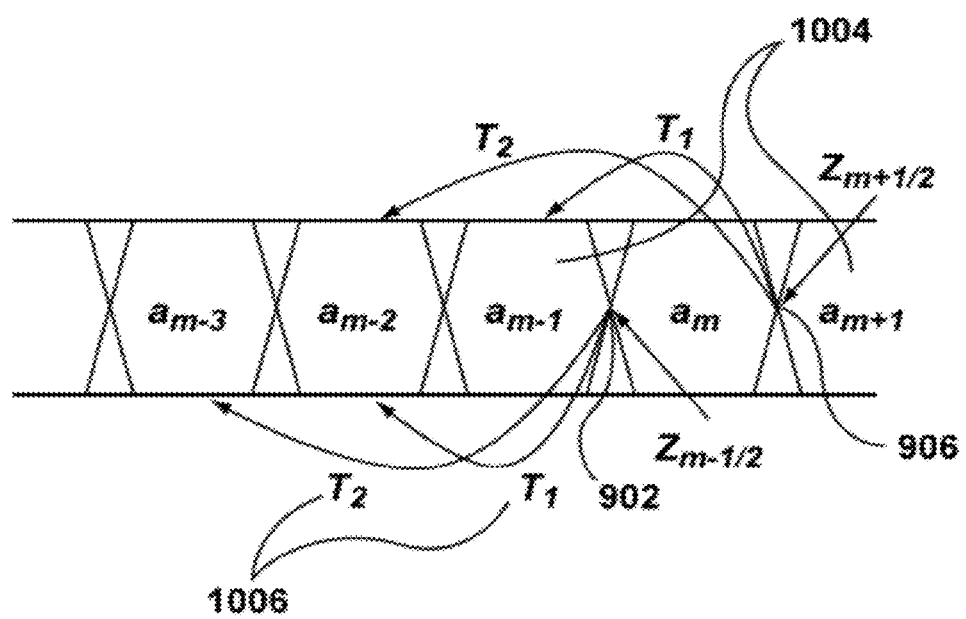
FIG. 10 is a pictorial eye diagram showing transmitted symbols and the two edge samples $Z_{m\pm0.5}$ with the corresponding DFE (decision feedback equalizer) tap weights according to an example embodiment.

The approach used in example embodiments of the present invention chooses the appropriate patterns to adapt each tap. It uses a single pattern per tap and computes the error signal from the sum of consecutive edge decisions for a lone 1 or 0 following these patterns, i.e.

$$error \propto z_{m-1/2} + z_{m+1/2}$$

where $Z_{m\pm0.5}$ are the edge sampler values 0.5UI before 902 and after 906 the lone bit 904 as shown on FIG. 9. FIG. 9 shows the pulse response 900 of an arbitrary channel after being compensated by a continuous time linear equalizer. The edge ISI terms 908 are marked as squares whereas the data ISI terms 910 are marked as circles.

Where $\phi$ is the pulse response 900 of the channel under consideration, $a_m$ is the transmitted symbols $\{\pm1\}$ 1004 shown in FIG. 10, and $T_k$ are the DFE tap weights 1006, an expression for the error equation can be expanded to the following:

$$error \propto \left[\phi\left(t - \frac{T}{2} - T\right) - 0\right] \times [a_{m+1} + a_{m+2}] +$$

$$\left[\phi\left(t + \frac{T}{2} + T\right) - T_1\right] \times [a_{m-1} + a_{m-2}] + \left[\phi\left(t + \frac{T}{2} + 2T\right) - T_2\right] \times$$

$$[a_{m-2} + a_{m-3}] + \left[\phi\left(t + \frac{T}{2} + 3T\right) - T_3\right] \times [a_{m-3} + a_{m-4}] +$$

$$\left[\phi\left(t + \frac{T}{2} + 4T\right) - T_4\right] \times [a_{m-4} + a_{m-5}] +$$

$$\left[\phi\left(t + \frac{T}{2} + 5T\right) - T_5\right] \times [a_{m-5} + a_{m-6}] +$$

$$\left[\phi\left(t + \frac{T}{2} + 6T\right) - 0\right] \times [a_{m-6} + a_{m-7}]$$

This equation indicates that, while adapting Tk, if the following conditions are satisfied:

$$a_{m-k} = a_{m-k-1} \text{ and } a_{m-p} \neq a_{m-p-1} \text{ where } p \neq k$$

then all the irrelevant ISI terms will cancel out from the error equation, making the error equation only a function of:

$$\left[\phi\left(t + \frac{T}{2} + kT\right) - T_k\right].$$

These criteria ensure that the multi-dimensional optimization problem is decoupled into individual 1-dimensional optimization problems, which simplifies the adaptation procedure of the DFE taps. Also, the patterns can be selected in a way to filter out any pre-cursor ISI term that can throw off the adaptation results. This can be achieved if the following condition is satisfied:

$$a_{m+1} \neq a_{m+2}.$$

TABLE 2

Patterns required for adapting the edge DFE tap weights based on the proposed S-ZF algorithm

| Tap no. | Data Pattern | | |
|---------|--------------|---|---|
|         | $a_{m-6} \ldots a_{m-2}$ | $a_{m-1} a_m a_{m+1}$ | $a_{m+2}$ |
| T1      | 01010        | 010 | 1 |
| T2      | 01011        | 010 | 1 |
| T3      | 01001        | 010 | 1 |
| T4      | 01101        | 010 | 1 |
| T5      | 00101        | 010 | 1 |

It is interesting to note that in example embodiments the proposed adaptation algorithm does not carry forward any residual adaptation error from one tap to the next tap. This is a result of using this pattern filtering technique, which masks the irrelevant ISI term from the error equation while calibrating any given tap. Furthermore, this algorithm does not need a specific training sequence to adapt the DFE tap weights. It can adapt using any pseudo random binary sequence (PRBS) as long as it contains the patterns in Table 2.

This same technique can be also extended to adapt the continuous time linear equalizer (CTLE) by choosing a pattern that generates an error signal that is proportional to $$\Sigma_{k=1 to 5}[ISI_{k,5}]$$

such that the CTLE will act to minimize the sum of the edge ISI components resulting in the maximum eye x-opening at the output of the CTLE. This can be achieved if the following condition is satisfied:

$$a_{m-k} = a_{m-k-1} \text{ for } k=1 \text{ to } 5$$

By re-writing the error equation for the CTLE one can show that under this condition the error equation becomes:

$$\text{error} \propto \sum_{k=1}^{5} \phi\left(t + \frac{T}{2} + kT\right)$$

Table 3 shows the pattern for the CTLE adaptation. Also note that, the pre-cursor ISI term is cancelled out by setting $a_{m+1} \neq a_{m+2}$.

TABLE 3

Pattern for adapting the CTLE based on the proposed S-ZF algorithm

|  | $a_{m-6} \ldots a_{m-2}$ | $a_{m-1} a_m a_{m+1}$ | $a_{m+2}$ |
|---|---|---|---|
| Data Pattern | 00000 | 010 | 1 |

TABLE 4

Different possible values of the edge samples Zm ± 0.5 and their intuitive meaning

| $\text{Sgn}(z_{m-1/2})$ | $\text{Sgn}(z_{m+1/2})$ | Timing | Equalization |
|---|---|---|---|
| −ve | +ve | CDR Phase is Early | No Value |
| −ve | −ve | No Value | Under-Equalized |
| +ve | +ve | No Value | Over-Equalized |
| +ve | −ve | CDR Phase is Late | No Value |

To intuitively explain the reason behind generating the error signal based on the sum of the edge values in Table 4 shows the different possible Values of the edge samples $Z_{m \pm 0.5}$ and what they imply. This general approach for adaptation has been previously used with CDRs to adapt CTLEs.

DFE Comparator Implementation

Traditionally DFE comparators use a two stage approach; a summer stage followed by a latch stage. However, this approach is not suitable for high-speed operation, since the DFE comparator has to take a decision and multiply it by tap 1 and feed it back to the summer all within 1UI. The other popular approach is to combine the summation and latching at the same stage. This improves the timing around the DFE feedback loop allowing for high-speed operation. However the standard DFE comparators implementations based on differential pair input stages are not suitable for low-voltage operation down to 0.9V.

According to example embodiments, a DFE comparator 400 is shown in FIG. 4 and is composed of a 2 stage track/latch having a cross coupled latch branch 408. The first stage includes a main branch 402, an identical offset branch 404 to cancel the Rx front-end offset, and 5 tap branches 406 with the tap 1 branch having ½ the transistor size of the main branch and taps 2 to 5 having ¼ of the main branch transistor size. This scaling helps reduce the DFE comparator power consumption, and helps raise the comparator output common-mode voltage without requiring a small load resistance. The comparators 400 use a pseudo-CML topology as opposed to a standard CML topology to allow for 12 Gbps operation from a 0.9V supply. The elimination of the tail current source gives some extra headroom which allows for operation from a lower supply voltage. In example embodiments, the input common-mode can be accurately set by using a common-mode feedback loop in the last stage 300 of the CTLE 104 preceding the DFE 106. Furthermore, the same common-mode reference voltage is used to set the mid-voltage of a resistive ladder which is used to generate the offset and tap voltages. The offset branch 404 is chosen to be identical to the main branch 402 to allow using the offset input to sweep the vertical offset voltage when the eye monitor is enabled where one of the edge comparators 400 is disconnected from the CDR loop 108 and re-used as an on-chip eye-monitor for test & debugging purposes. In this mode, the CDR 108 uses only one of the edge comparators 400 to generate the early/late information whereas the second edge comparator 400 is disconnected from the loop by masking its output from the phase detector 116. At the same time, the clock input 414 to this comparator is swept using a digitally controlled variable delay line to generate the horizontal sweep, and the comparator threshold is swept via the offset input branch of that comparator to generate the vertical sweep. This enables the on-chip eye monitor to produce a 2-dimensional plot of the bit error rate versus the comparator threshold and timing. The 2-dimensional gradient of this bit error rate plot is then computed to generate a plot for the comparator eye diagram.

Figure 12:
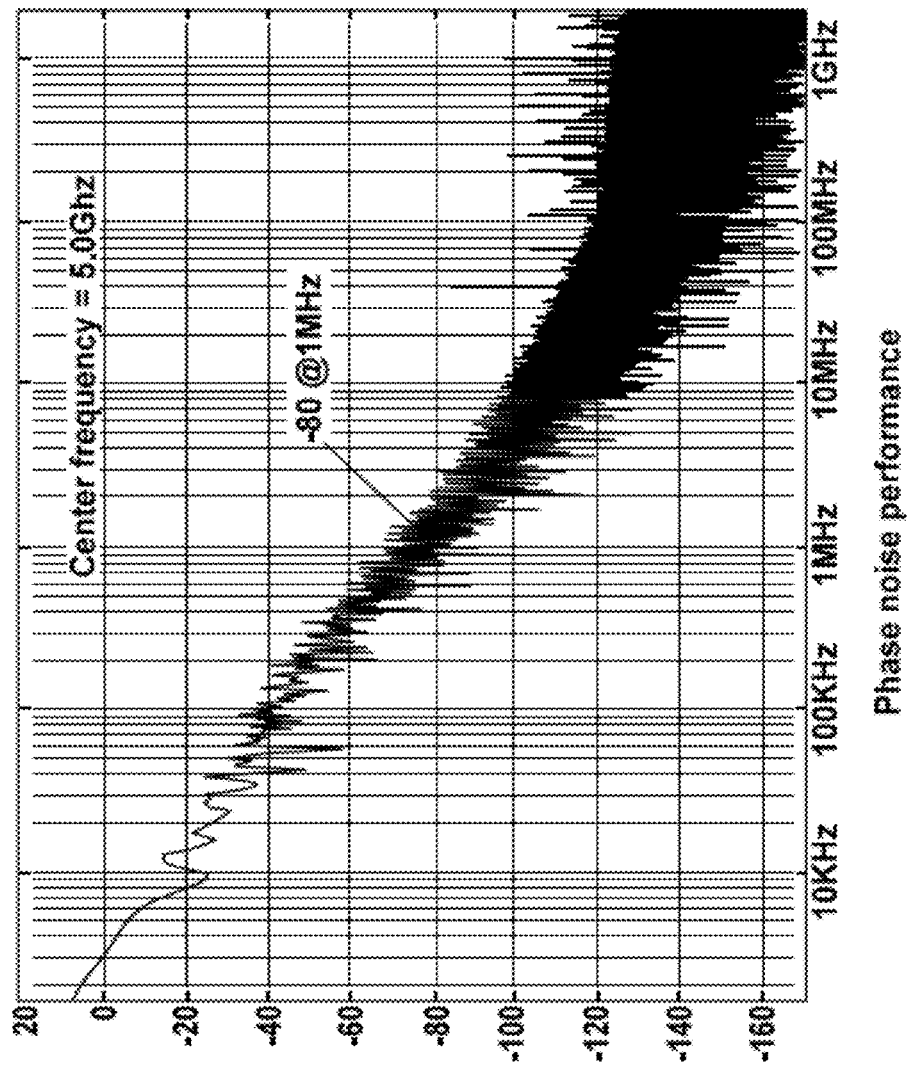
FIG. 12 is a graph of measured VCO clock phase noise for 5 GHz (10 Gbps) at 14 MHz offset frequency for the VCO in FIG. 11.
Figure 13:
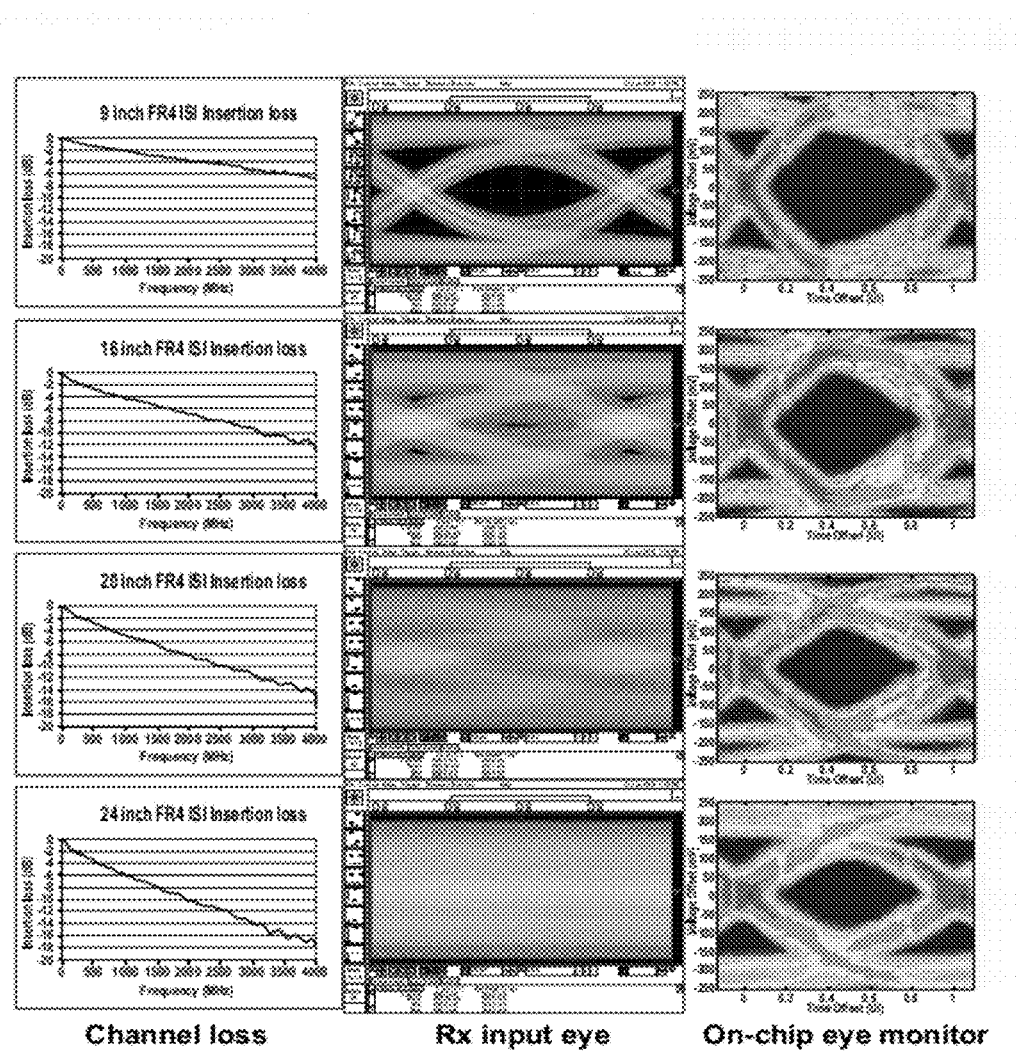
FIG. 13 is a table of eye monitor results after auto-calibration of a CTLE according to an example embodiment, for 8 Gbps PRBS11 data comparing it to the Rx eye for different FR4 trace lengths.
Figure 14:
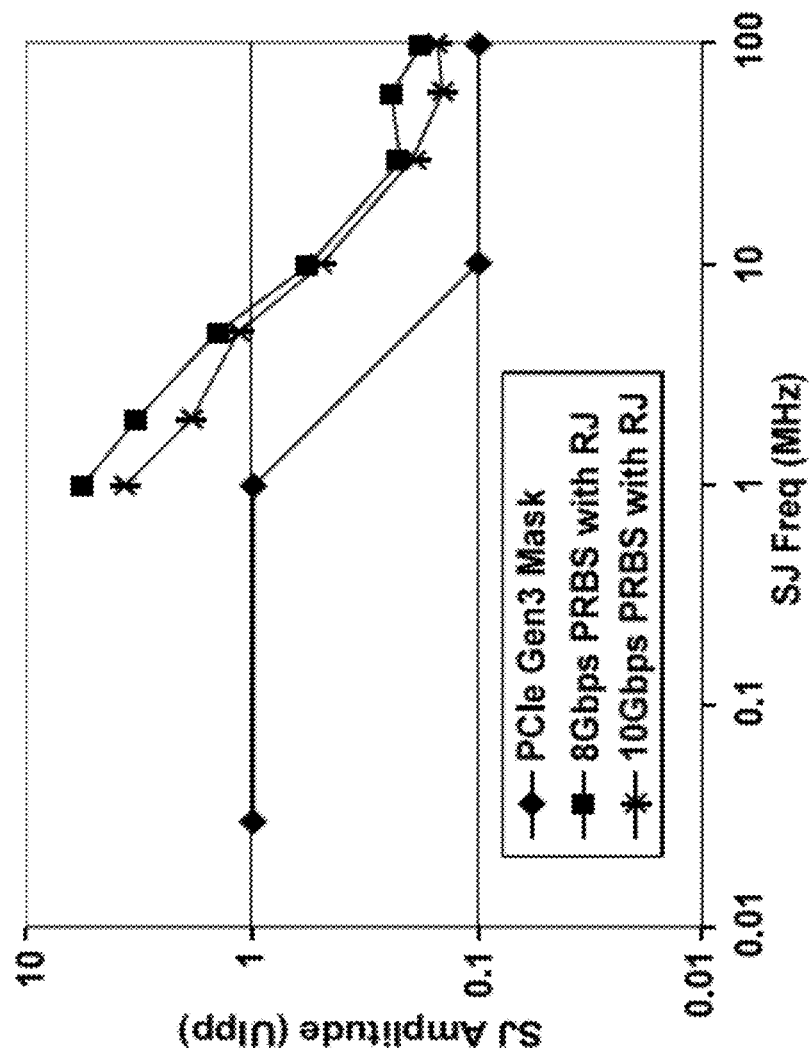
FIG. 14 is a graph of receiver jitter tolerance with 0.2UIpp RJ and PRBS7, according to an example embodiment.

An example VCO used in some embodiments is shown in FIG. 11. The VCO 1100 has a pair of fixed current sources 1102. The VCO DAC 124 used here is an 8-bit calibration DAC 1104. The VCO has four delay cells 1106, each of which is laid out in some embodiments according to the delay cell schematic 1108. The performance of the phase noise of this example VCO is illustrated in FIG. 12.

The example embodiments of the present disclosure described above are intended to be examples only. Those of skill in the art may effect alterations, modifications and variations to the particular embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

REFERENCES

The following documents are incorporated herein by reference:

[1] Hidaka, Y. Weixin Gai Horie, T. Jian Hong Jiang Koyanagi, Y. Osone, H. "A 4-Channel 1.25-10.3 Gb/s Backplane Transceiver Macro With 35 dB Equalizer and Sign-Based Zero-Forcing Adaptive Control" IEEE J. Solid-State Circuits, vol. 44, pp. 3547-3559, December, 2009.

[2] E-Hung Chen, Jihong Ren, Leibowitz, B., Hae-Chang Lee, Qi Lin, Kyung Oh, Lambrecht, F., Stojanovic, V., Zerbe, J., Yang, C.-K.K., "Near-Optimal Equalizer and Timing Adaptation for I/O Links Using a BER-Based Metric" "IEEE J. Solid-State Circuits, vol. 43, pp. 2144-2156, September, 2008.

[3] S. Wu, S. Ramaswamy, B. Bhakta, P. Landman, R. Payne, V. Gupta, B. Parthasarathy, S. Deshpande, and W. Lee, "Design of a 6.25 Gbps backplane SerDes with TOP-down design methodology", DesignCon, pp. 2004.

[4] Jihong Ren, Haechang Lee, Dan Oh, Brian Leibowitz, Vladimir Stojanovic, Jared Zerbe, and Nhat Nguyen. Performance Analysis of Edge-based DFE. Electrical Performance of Electronic Packaging, 2006 IEEE, pages 265-268, October 2006.

[5] R. Payne, P. Landman, B. Bhakta, S. Ramaswamy, S. Wu, J. D. Powers, M. U. Erdogan, A-L. Yee, R. Gu, L. Wu, Y. Xie, B. Parthasarathy, K. Brouse, W. Mohammed, K. Heragu, V. Gupta, L. Dyson and W. Lee "A 6.25-Gb/s binary transceiver in 0.13-$\mu$m CMOS for serial data transmission across high loss legacy backplane channels", IEEE J. Solid-State Circuits, vol. 40, pp. 2646-2657, 2005.

[6] Huaide Wang, Jri Lee "A 21-Gb/s 87-mW Transceiver With FFE/DFE/Analog Equalizer in 65-nm CMOS Technology," IEEE J. Solid-State Circuits, vol. 45, pp. 909-920, April 2010. References:

[7] Ganesh Balamurugan, Frank O'Mahony, Mozhgan Mansuri, James E Jaussi, Joseph T Kennedy, Bryan Casper "A 5-to-25 Gb/s 1.6-to-3.8 mW/(Gb/s) Reconfigurable Transceiver in 45 nm CMOS", IEEE Solid-State Circuits Conference, pp. 372-373, February, 2010.

[8] Nagendra Krishnapura, Majid Barazande-Pour, Qasim Chaudhry, John Khoury, Kadaba Lakshmikumar, Akshay Aggarwal, "A 5 Gb/s NRZ Transceiver with Adaptive Equalization for Backplane Transmission"," IEEE Solid-State Circuits Conference, pp. 60-61, February, 2005.

What is claimed is:

1. A method for adapting an equalizer having a plurality of taps spaced sequentially at periods of one clock unit for observing a digital data system response produced by a digital system, comprising:
applying an arbitrary digital data sequence to the digital system;
detecting a first predetermined digital data pattern in the data sequence;
calculating a first error signal for a first tap of the plurality of taps based on the system response to the first data pattern;
using the first error signal to adapt the first tap; and
repeating the steps of detecting, calculating, and adapting for each tap other than the first tap in the plurality of taps,
wherein:
the digital data pattern used in conjunction with a given tap at position k in the plurality of taps has equal symbol values at positions (m−k) and (m−k−1) and different symbol values at positions (m−p) and (m−p−1), where p is not equal to k, for some value of m, thereby comprising a digital data pattern having a lone bit; and
the error signal calculated for the tap at sequential position k is proportional to the sum of the values of the system response measured at zero crossings directly before and after the lone bit of the digital data pattern.

2. The method of claim 1, wherein the equalizer comprises a decision feedback equalizer.

3. The method of claim 1, wherein the plurality of taps comprises five taps.

4. The method of claim 1, wherein the taps are adapted sequentially in time according to their sequential positions.

5. The method of claim 1, the system further comprising a clock and data recovery stage having comparators used by the clock and data recovery stage to sample data and obtain edge information for decision feedback adaptation, wherein the clock and data recovery stage comparators are also used to obtain edge information for adapting the taps of the equalizer.

6. The method of claim 1, wherein adapting the first tap comprises applying de-emphasis or pre-emphasis based on the calculated first error signal.

7. The method of claim 1, wherein the system comprises at least one far-end transmit pre-emphasis tap, the method further comprising:
transmitting at least one of the calculated error signals to the at least one far-end transmit pre-emphasis tap; and
adapting the at least one far-end transmit pre-emphasis tap based on the at least one transmitted calculated error signal.

8. The method of claim 1, wherein the plurality of taps comprises N taps, and wherein the equalizer further comprises a linear equalizer, the method further comprising:
detecting a second data pattern in the data sequence having equal symbol values at positions (m−k) and (m−k−1) for tap position k having values from 1 to N;
calculating a linear equalizer error signal which is proportional to the sum of the first N samples of the system response at each data edge following the symbol at position m; and
adapting the linear equalizer using the linear equalizer error signal.

9. The method of claim 8, wherein the linear equalizer comprises a continuous time linear equalizer.

10. A decision feedback equalizer having at least one comparator, the at least one comparator comprising:
a first stage, comprising:
a main branch having two track switches with a resistive load;
an offset cancellation branch;
a plurality of tap branches with transistor sizes smaller than the main branch, in which previous decisions of the equalizer are mixed with tap weights using current-mode switching;
a cross coupled latch branch;
at least one output path in parallel communication with the tap branches and the cross coupled latch branch, and in communication with the main branch between the resistive load and the two track switches; and
a second stage, comprising:
a comparator module for making decisions based on the outputs of the first stage and a clock input; and
a plurality of flip-flops for storing the output of the comparator module.

11. The decision feedback equalizer of claim 10, wherein the offset cancellation branch has the same structure as the main branch.

12. The decision feedback equalizer of claim 10, wherein the at least one comparator comprises two edge comparators and two center comparators.

13. The decision feedback equalizer of claim 10, wherein the at least one comparator is implemented using a pseudo-current-mode logic topology.

14. A receiver front end comprising the decision feedback equalizer of claim 13, wherein the receiver front end further comprises a continuous time linear equalizer which comprises:

a differential pair input stage;

an active inductive load driven by the input stage;

a common mode feedback amplifier, driven by the output of the active inductive load, the amplifier having an output for setting a common mode for at least one pseudo-current-mode logic decision feedback equalizer comparator and for providing feedback to the active inductive load.

15. A receiver front end comprising the decision feedback equalizer of claim 10, wherein the receiver front end further comprises a programmable attenuator having a plurality of branches, each branch comprising:

a series switch;

a shunt switch; and a capacitor which can be changed from a series capacitor to a shunt capacitor based on the state of the series switch and the shunt switch.

16. The decision feedback equalizer of claim 10, wherein the at least one comparator is implemented as a differential pseudo-current mode logic structure comprising a cascade of a first NMOS transistor in common source orientation in series with a second NMOS transistor, wherein the second NMOS transistor acts as a switch and is connected at the drain terminal of the first NMOS transistor.

* * * * *